No. 676,705. Patented June 18, 1901.
G. W. STACY.
HOEING MACHINE.
(Application filed Apr. 3, 1901.)
(No Model.) 2 Sheets—Sheet 1.

WITNESSES:
H. R. Edelin
Perry B. Turpin

INVENTOR
George W. Stacy.
BY Munn & Co.
ATTORNEYS

THE NORRIS PETERS CO., PHOTO-LITHO., WASHINGTON, D. C.

No. 676,705. Patented June 18, 1901.
G. W. STACY.
HOEING MACHINE.
(Application filed Apr. 3, 1901.)
(No Model.) 2 Sheets—Sheet 2.
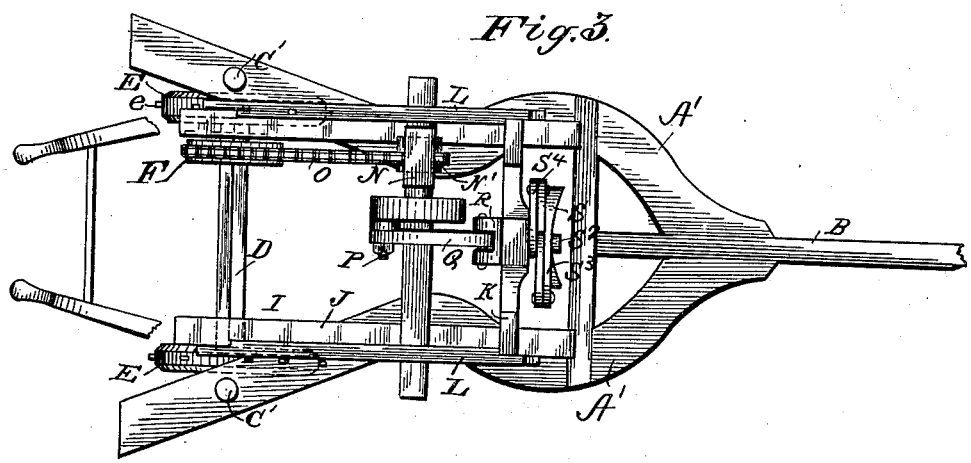
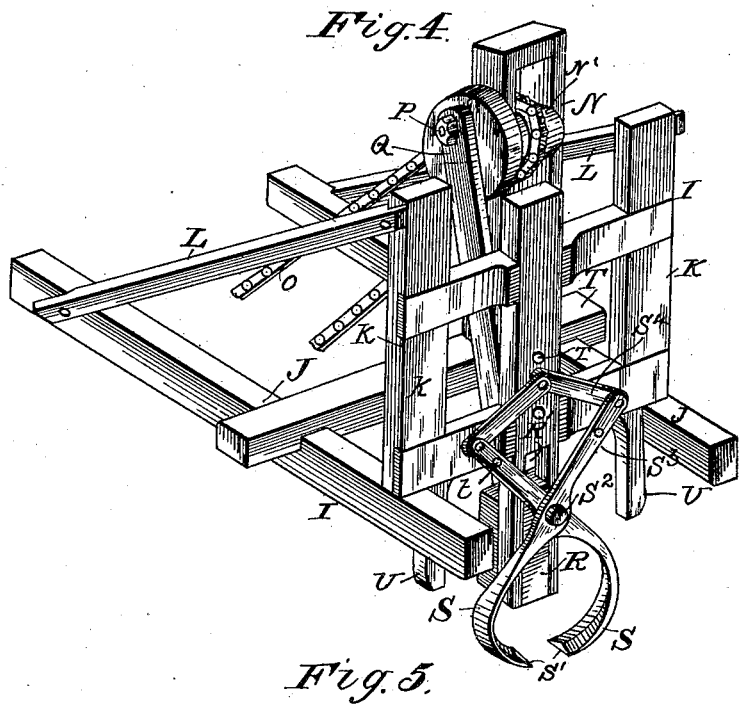
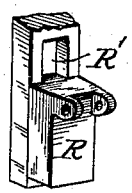
WITNESSES:
INVENTOR
George W. Stacy.
BY
ATTORNEYS

UNITED STATES PATENT OFFICE.

GEORGE WASHINGTON STACY, OF BELMONT, MISSISSIPPI, ASSIGNOR OF ONE-HALF TO JESSE C. HALLMARK AND JAMES W. VINSON, OF SAME PLACE.

HOEING-MACHINE.

SPECIFICATION forming part of Letters Patent No. 676,705, dated June 18, 1901.

Application filed April 3, 1901. Serial No. 54,141. (No model.)

*To all whom it may concern:*

Be it known that I, GEORGE WASHINGTON STACY, residing at Belmont, in the county of Tishomingo and State of Mississippi, have made certain new and useful Improvements in Hoeing-Machines, of which the following is a full, clear, and exact specification.

My invention is an improvement in hoeing-machines designed for use in chopping cotton or in other locations where it is desired to hoe the ground or thin out a growing crop; and the invention consists in certain novel constructions and combinations of parts, as will be hereinafter described and claimed.

Figure 1:
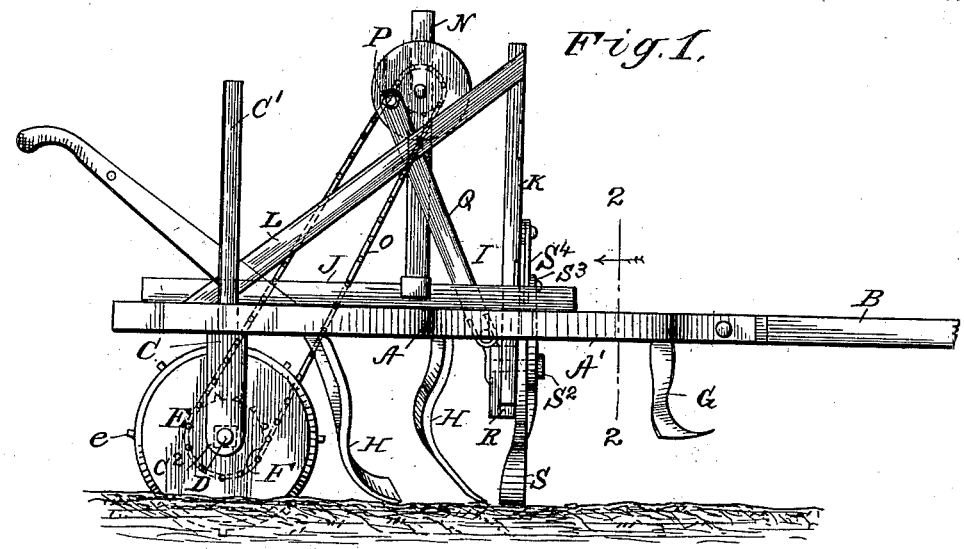
Figure 2:
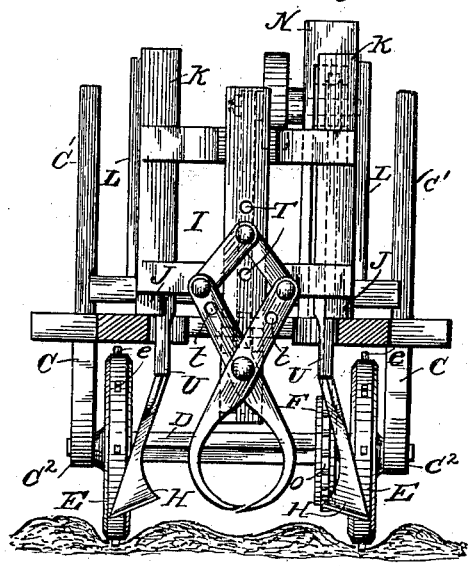

In the drawings, Figure 1 is a side elevation of a machine embodying my invention. Fig. 2 is a cross-sectional view on about line 2 2 of Fig. 1. Fig. 3 is a top plan view of the machine. Fig. 4 is a detail perspective view showing the hoeing devices and the supporting-frame therefor, and Fig. 5 is a detail perspective view of the carrier or slide for opening and closing the hoes.

My improvements are designed to be used in connection with any form of straddle-row cultivator and to be operated from the wheels of said cultivator.

The cultivator shown is formed with a top frame A, to which the pole B is connected, and said frame supports the bars C, which have extensions C' above the frame A and are adapted at their lower ends at $C^2$ to provide bearings in which may turn the ends of the axle D. This axle between the bars C is preferably non-circular in cross-section, so the wheels E can be adjusted along the same in order to run in the furrows or otherwise, as may be desired. The wheels E are beveled at their edges and are provided with projecting teeth or spurs $e$, which operate to crush clods and the like and to insure the turning of the wheels as the machine is moved along. Upon the shaft D is provided a drive-sprocket F for the purpose presently to be described. The frame A is provided with track-clearers G and cultivating-shovels H, and it is preferred to employ such cultivating-shovels; but manifestly they may be omitted when desired and slides or trailers be applied at the front of the frame A.

The hoeing-frame I is intended to be supported upon the frame A or other suitable supporting-frame, as will be understood from Figs. 1 and 2, and rests freely upon said frame, with its rear end lying between the upper extension C' of the bars C. Such frame I includes base-sills J and upright frame K near the front end thereof and braces L for said upright frame. It will be noticed that the top frame K of the cultivator or supporting frame is provided near its front end with the portions A', bowed outwardly in opposite directions, affording play for the operation of the hoes, which are supported and operate along the front side of the upright K of the hoeing-frame, and which parts are located relatively to the top frame A, as shown in Figs. 1 and 2. The hoe-frame I is also provided with a pulley-frame N, in which is journaled the sprocket pinion or pulley N', geared by the chain O with the pulley F on the axle D, and is arranged for operation as will be understood from Figs. 1 and 2. A crank P is connected with the pinion N' and is provided with a pitman Q, by which it is connected with the carrier R for the hoes. This carrier R is reciprocated vertically in guides R', formed in the front frame K, by means of the pitman Q, and as it is so reciprocated the carrier operates to open and close the hoes S, which are edged at their lower ends at S' and are arranged at such edge one to slightly pass the other, the hoes being supported on bars, which are pivoted between their ends at $S^2$ to the carrier and having above the pivot $S^2$ arms $S^3$, which are connected by links $S^4$ with the upright front frame K, as shown in Fig. 4. As best shown in said Fig. 4, I provide a series of holes T in the upright frame for the connection of the links $S^4$ therewith and also a plurality of holes $t$ in the arms $S^3$, so the connection of the links $S^4$ with the said arms $S^3$ and with the upright frame may be adjusted as desired.

In the operation of the described construction it is manifest that as the machine moves forward its wheels E will turn its drive-sprocket F, which will turn the pulley N' and operate the pitman to reciprocate the carrier-block and so cause the tong-like hoes to open and close and chop out the growing plant or hoe the ground, as desired.

As before suggested, the supporting-frame is provided near its rear end with the upwardly-projecting bars C' and near its forward end with the outwardly-bowed portions A'. These latter converge in front and rear of the widest point of the bowed portion of the frame, and the hoe-frame I fits at its rear end between the rods C' and is provided near its front end with depending bars U, which fit within the outwardly-bowed portion of the supporting-frame and by engaging with the converging walls of the outwardly-bowed portion prevent any longitudinal displacement of the hoeing-frame, it being held from lateral displacement by the bars U and the rods C', as before described.

Having thus described my invention, what I claim as new, and desire to secure by Letters Patent, is—

1. A machine substantially as described comprising a cultivator or supporting frame having wheels, a hoeing-frame supported on the said first frame and provided with movable tong-like hoes, and devices whereby the said tong-like hoes can be operated from the wheels of the cultivator-frame substantially as set forth.

2. The combination in a machine substantially as described of a cultivator having a top frame provided near its front end with outwardly-bowed portions, the hoe-frame supported on the cultivator-frame and provided with an upright frame adjacent to the outwardly-bowed portions of the cultivator-frame and having said upright frame provided with ways for the hoe-carrier, the hoe-carrier sliding in said ways, means for reciprocating the hoe-carrier, and the hoe-bars arranged to chop or hoe at their lower ends, pivoted between their ends to the hoe-carrier and having upwardly-extended arms beyond the pivot, and links connecting said upwardly-extending arms with the framing substantially as set forth.

3. The combination of the cultivator and hoe framing the drive-wheels, a sprocket arranged to be driven by said wheels, a chain passed around said sprocket, a sprocket in the hoe-frame arranged for operation by said chain and provided with a crank, a sliding hoe-carrier, a pitman connecting said carrier with the said crank, the hoes having bars pivoted between their ends to the carrier, and the links connecting the upper arms of said hoe-bars with the framing substantially as set forth.

4. In an apparatus substantially as described the combination of the tong-like hoe having its hoe-bars arranged to cut or hoe at their lower ends, a reciprocating carrier to which said bars are pivoted between their ends, means for operating said carrier, and links connecting the upper arms of said hoe-bars with the framing substantially as set forth.

5. In a machine substantially as described a hoeing-frame provided with a front frame having ways for a reciprocating carrier, the carrier in said ways, a pulley-frame, a pulley in said frame and provided with a crank, a pitman connecting said crank with the carrier, the hoe-bars pivoted between their ends to the carrier and links connecting the upper ends of said bars with the framing substantially as set forth.

6. The combination substantially as described of the supporting-framing having a top frame, the hoeing-frame supported upon said top frame and provided with the hoeing devices, the said frames being provided relatively with vertically-projecting parts whereby the hoeing-frame is held from displacement longitudinally or laterally substantially as set forth.

7. The combination substantially as herein described of the supporting-frame provided near its rear end with upwardly-projecting bars and having near its forward end outwardly-bowed portions which converge in front and rear of the widest point of said front end of the frame, and the hoe-frame provided with the hoeing devices and supported on the supporting-frame with its rear end lying between the upwardly-projecting bars of the supporting-frame, and depending bars or legs at the front end of the hoeing-frame and fitting within the outwardly-bowed portion of the supporting-frame whereby the hoeing-frame is held from displacement longitudinally or laterally substantially as set forth.

8. A hoeing-machine having wheels and a pair of tong-like hoes having pivoted bars, and means for operating said hoes from the wheels of the implement substantially as set forth.

GEORGE WASHINGTON STACY.

Witnesses:
WILLIAM T. CLARK,
GEORGE S. JACKSON.